Aug. 7, 1962 R. J. THOMAS 3,048,458
DISPOSABLE CAR TRAY
Filed Aug. 8, 1961
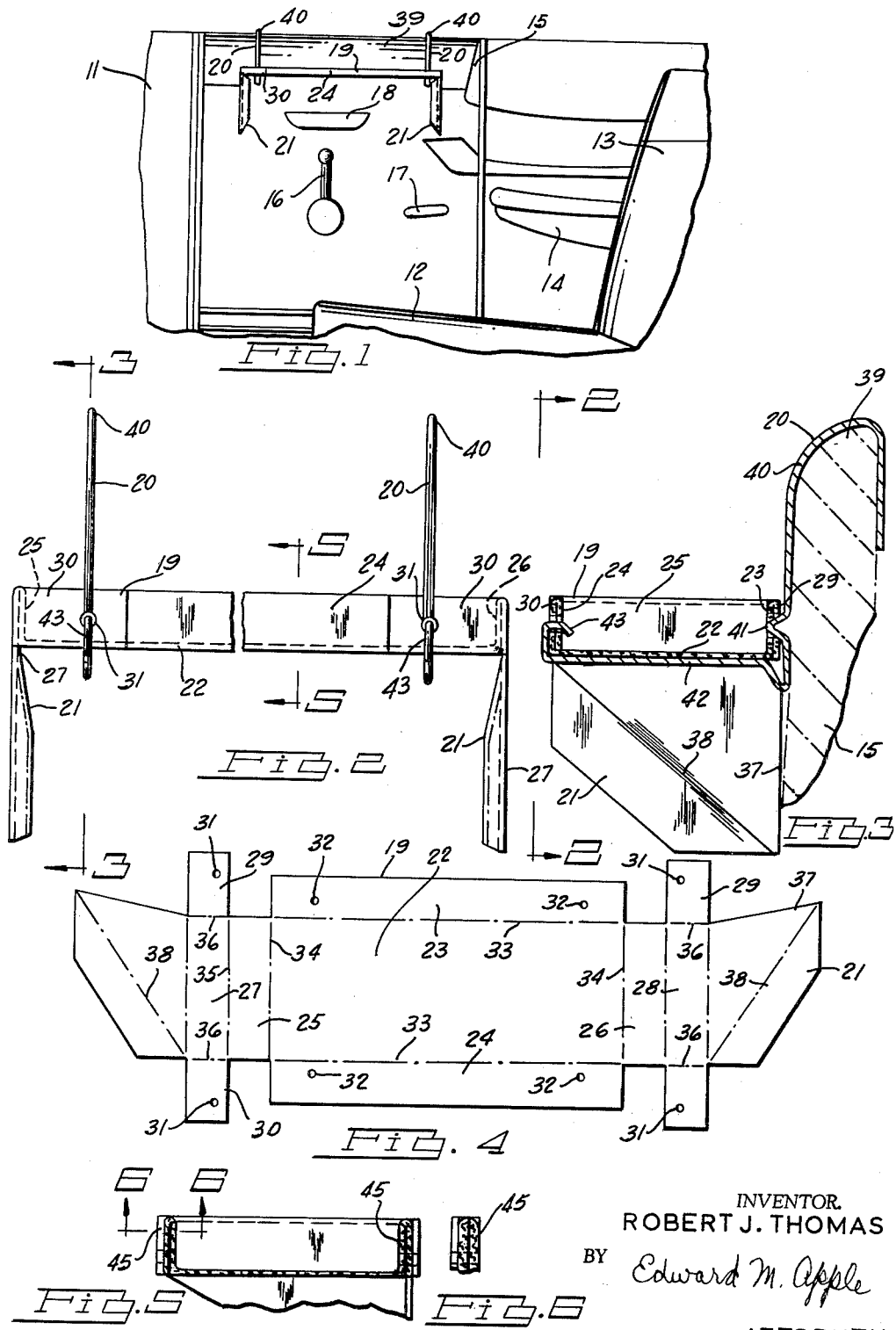
INVENTOR.
ROBERT J. THOMAS
BY Edward M. Apple
ATTORNEY

United States Patent Office 3,048,458
Patented Aug. 7, 1962

3,048,458
DISPOSABLE CAR TRAY
Robert J. Thomas, 3451 Academy, Dearborn 8, Mich.
Filed Aug. 8, 1961, Ser. No. 130,091
2 Claims. (Cl. 311—22)

This invention relates to automobile accessories and has particular reference to a tray, which may be attached to the inside of an automobile door, or window frame, for holding food and drink containers, while at a drive-in restaurant, drive-in movie, picnic, or the like.

An object of the invention is to provide such a device, which is simple in construction, economical to manufacture and one which may be readily disposed of after use.

Another object of the invention is to provide a device of the character indicated, which may be stored, or transported, in flat knocked down condition and can be assembled for use by an ordinary person, without the necessity of using tools or special equipment.

Another object of the invention is to provide a device of the character indicated, which is fabricated in large part, out of inexpensive cardboard, which also serves as the carrier for advertising media, or other intelligible subject matter, for the benefit of the user.

I am aware that car trays of this character have already been known to the public, but the devices heretofore known have either been bulky, cumbersome, and expensive to manufacture, or they have been constructed in such a manner that they had to be handled and used as semi-permanent fixtures, which could only be stored, or transported, in a comparatively large space. Such devices could not be provided for, transported and used individually, by a large group in a station wagon, or other vehicle while on tour, or for picnicking, without requiring the use of more space than could be devoted to such a purpose, consequently, the trays were not at hand when most needed.

An object of the invention, therefore, is to obviate such conditions and to provide a car tray which is so inexpensive that it may be used once and then discarded, or may be knocked down and carried flat, in a bare minimum of space, for subsequent use.

The foregoing and other objects and advantages of the invention will become more apparent as the description proceeds, reference being made from time to time to the accompanying drawing forming part of the within disclosure, in which drawing:

FIG. 1 is a fragmentary elevational view of the interior of an automobile to which is secured a device embodying the invention.

FIG. 2 is an enlarged elevational view, with parts broken away, of the device shown in FIG. 1 and taken on the line 2—2 of FIG. 3.

FIG. 3 is a section taken substantially on the line 3—3 of FIG. 2.

FIG. 4 is a plan view of the blank comprising the tray and the support brackets before assembly.

FIG. 5 is a section taken through a modified form of tray in which the side walls of the tray are reinforced by doubling over and cementing the material comprising the side wall.

FIG. 6 is a section taken substantially on the line 6—6 of FIG. 5.

Referring now more particularly to the drawing, it will be understood that in the embodiment herein disclosed, the reference character 11 indicates, in general, an automobile having a seat 12, backrest 13, armrest 14, door 15, window lift 16, door latch 17 and hand grip 18, all of which are conventional parts of a motor vehicle and form no part of the invention, except as they are combined with the structure hereinafter described.

The device embodying the invention consists of a tray 19, a pair of wire hangers 20 and supporting brackets 21. The tray 19 and brackets 21 are preferably formed of a unitary piece of heavy cardboard, or the like, which is blanked out, as shown in FIG. 4, to form the tray bottom 22, side walls 23 and 24, and end walls 25 and 26. The end walls 25 and 26 each have an extension 27 and 28, which terminates in a pair of tabs 29 and 30, which tabs are perforated, as at 31, and are arranged to overlie the side wall members 23 and 24, so that the apertures 31 of the tabs on each end member align with the adjacent apertures 32 of the side wall members 23 and 24. The blank is scored on the broken lines 33 and 34 to form the side and end walls, and the blank is scored on the broken lines 35 and 36 so that the extensions 27 and 28 may be bent downwardly and the tabs 29 and 30 may be bent inwardly to overlie the side members 23 and 24 when the tray is assembled. When the extensions 27 and 28 are bent downwardly, their terminal ends form the brackets 21 as shown in FIGS. 2 and 3. This is an important feature of the invention. The edges 37 of the brackets 21 (FIG. 3) abut against the door panel 15 and help support the tray 19, by preventing the downward and outward movements of the tray, with reference to the door 15. Each bracket 21 is scored and slightly bent on the line 38 to add stiffness to the bracket.

The tray 19 is hung on the window sill 39 by means of the wire hangers 20, which are bent to form hooks 40 (FIG. 3), which engage the sill 39 and extend downwardly between the door panel 15 and the glass (not shown). The hangers 20 have detents 41 (FIG. 3) formed thereon, which are received in the apertures 31 and 32 of the rear wall of the tray. Each hanger 20 (FIG. 3) is also provided with a straight portion 42, upon which the tray 19 rests, and a small hook 43 which engages the apertures 31 and 32 of the front wall of the tray when assembled.

In assembling the device, I first fold the blank on the lines 33 and 34 to form the side and end walls. The extensions 27 and 28 are then bent downwardly on the lines 35 and the tabs 29 and 30 are then bent inwardly on the lines 36, so that the tabs 29 and 30 overlie the outside of the side walls 23 and 24. The hooks 43 are next inserted in the tab and front wall apertures 31 and 32 and the straight portions 42 of the hooks are brought under the tray, after which the detents 41 are snapped into the tab and rear wall apertures 31 and 32 and the device is ready to be hung on the door panel by the large hooks 40.

In FIGS. 5 and 6 I show a modified form of tray in which the side walls are made of double thicknesses of material and are cemented as at 45. In other respects the tray is the same as previously described.

It is believed that the operation of the device is obvious from the foregoing description.

Having described my invention, what I claim and desire to secure, by Letters Patent is:

1. A disposable tray for an automobile comprising a unitary piece of cardboard cut and scored whereby to form a rectangular main section which serves as the bottom of said tray, said main section having score lines defining side and end elements which serve as the side and end walls of said tray, when bent upwardly along said score lines, each of said end elements having an angular extension thereon which is downwardly bendable along a score line to form a support member for said tray, and each of said end elements having a perforated tab thereon bendable along another score line to form elements which overlie said side walls, there being perforations in said side walls in alignment with the said tab perforations, and wire hook members having a portion extending beneath said tray and having elements thereon received in the said perforations, said last named elements serving to prevent the displacement of said side and end walls when the tray is in use.

2. The structure of claim 1, in which said downwardly bendable support members are scored along other lines to provide wing-like members which may be angularly positioned to the main portions of said support members.

References Cited in the file of this patent

UNITED STATES PATENTS

| | | |
|---|---|---|
| 1,446,231 | West | Feb. 20, 1923 |
| 1,915,958 | Skirrow | June 27, 1933 |
| 2,211,962 | Morris | Aug. 20, 1940 |
| 2,511,189 | Woodward | June 13, 1950 |
| 2,512,963 | Peiker | June 27, 1950 |
| 2,605,154 | Clements et al. | July 29, 1952 |
| 2,629,535 | Ullrich | Feb. 24, 1953 |
| 2,695,712 | Kolander | Nov. 30, 1954 |
| 2,770,411 | MacKay | Nov. 13, 1956 |
| 2,770,513 | Brown | Nov. 13, 1956 |
| 2,889,051 | Kramer | June 2, 1959 |